United States Patent [19]

Oshima et al.

[11] Patent Number: 5,444,481
[45] Date of Patent: Aug. 22, 1995

[54] METHOD OF CALIBRATING A CCD CAMERA

[75] Inventors: Masatoshi Ohshima, Aichi; Yoshihide Aoki, Nagoya, both of Japan

[73] Assignee: Sanyo Machine Works, Ltd., Aichi, Japan

[21] Appl. No.: 354,054

[22] Filed: Dec. 6, 1994

Related U.S. Application Data

[63] Continuation of Ser. No. 5,218, Jan. 15, 1993, abandoned.

[51] Int. Cl.$^6$ ................. H04N 17/00; H04N 5/232
[52] U.S. Cl. .................... 348/187; 348/94; 348/95; 348/134; 348/180; 356/141.4; 356/400
[58] Field of Search ............ 356/141.4, 400; 348/180, 187, 134, 94, 95; H04N 17/00, 5/232

[56] References Cited

U.S. PATENT DOCUMENTS 5,196,900 5/1993 Pettersen ................. 356/141

Primary Examiner—Michael T. Razavi
Assistant Examiner—Andrew B. Christensen
Attorney, Agent, or Firm—Nikaido, Marmelstein, Murray & Oram

[57] ABSTRACT

A method of calibrating a CCD camera comprising those sequential processes comprises steps of shifting a spot light source held by a positioning device, in front of a fixed CCD camera between two remote points on a visual line in order that light beam in the center of the light source can be incident upon predetermined picture element of a solid sensor built in the CCD camera, computing angles between a plurality of visual lines generated by shifting the light source and the optical axis of the CCD camera based on position data related to the positioning device, and calibrating the corresponding relationship between the angle of light beam incident upon the CCD camera and the predetermined picture elements built in the solid sensor.

1 Claim, 2 Drawing Sheets

METHOD OF CALIBRATING A CCD CAMERA

This application is a continuation application Ser. No. 08/005,218 filed Jan. 15, 1993, abandoned.

BACKGROUND OF THE INVENTION

1. Field of the Invention

The present invention relates to a method of calibrating a CCD camera. More particularly, the invention relates to a method of calibrating distortion of a solid camera and a lens system built in a high-resolution CCD sensor.

b 2. Description of the Prior Art

Reflecting the significantly improved resolution of CCD cameras as a result of the increased number of picture elements built in each solid sensor, recently, demand for those high-resolution CCD cameras has sharply grown as image sensors for picking up image of processed objects in those processes for manufacturing, assembling, and inspecting a variety of automotive parts and bodies. Image data picked up by each CCD camera are eventually processed by a computer system via an image processing unit, and then, based on those processed data, appearance of the processed parts and bodies is finely measured and inspected.

Each picture element built in a solid sensor of a CCD camera has several microns of magnitude. When operating a CCD camera incorporating 1000×1000 units of picture elements under a certain condition, the CCD camera measures the appearance of the objective body in micron order. Nevertheless, if there were even the micron-order distortion in the arrangement of picture elements in a solid sensor normally containing a large number of picture elements respectively being aligned in a latticed formation or in the arrangement of a lens system projecting light reflected from an objective body against the solid sensor, or if there were fine deviation in the assembly of the solid sensor and the lens system, then, unwanted distortion will be generated in those images present in specific domains corresponding to the above-cited distorted or deviated spots, thus eventually generating error that adversely affects the measured value beyond an allowable scope.

For example, see FIG. 4. Assume that there is such a CCD camera 1 which is capable of correctly functioning itself in terms of performance accuracy, where light beam from point "P" on a visual line "b" of angle "α" against optical axis "a" of a lens system 4 is incident upon a picture element 3m built in a solid sensor 2. Also assume that there is distortion in the lens system 4 to cause the light beam from the point "P" to be incident upon another picture element 3n adjoining the picture element 3m. Then, since there is distortion in the lens system 4, the CCD camera 1 incorrectly identifies that there is a point "P" in the direction of a visual line "c" designated by a dot-chain line connecting the picture element 3n to the principal point Q of the lens system 4. This is because angles "α" and "α'" between the optical axis "a" and the visual line "b" and between the optical axis "a"0 and the visual line "c" are respectively different from each other. In consequence, the farther the distance from the point "P", the poorer the precision of the measured value of the three-dimensional coordinate of the point "P".

Therefore, whenever operating such a CCD camera requiring extremely high precision, it is essential for the inspection system to calibrate the CCD camera beforehand in order to correct the measured value which is adversely affected by the distortion cited earlier. To implement this, as shown in FIG. 5 for example, a calibration method by rotating a CCD camera in the vertical and horizontal directions has been developed. FIG. 5 schematically illustrates the calibration method cited above, where an objective CCD camera is secured onto a swingable base 10, which is capable of rotating the CCD camera in the vertical and horizontal directions by way of pivoting on the principal point Q of a lens system 4. Specifically, using a rotary encoder (not shown) available for measuring angle of the rotation of the CCD camera in the vertical and horizontal directions, the objective CCD camera is rotated in the vertical and horizontal directions. The above-cited conventional calibration method is described below.

A light source 11 is disposed at a predetermined position in front of the objective CCD camera 1. The objective CCD camera 1 is rotated in order that light beam from the light source 11 can be incident upon a picture element 3s in the principal of a solid sensor 2 built in the objective CCD camera 1. In this case, the light source 11 is exactly in accord with the optical axis "a" of the objective CCD camera 1, and thus, the direction of the optical axis "a" is determined. Next, as shown in FIG. 5 with a dot-chain line for example, the CCD camera 1 is rotated in the upward direction by such an amount corresponding to angle "α" by way of pivoting on the principal point Q of the lens system 4. If the CCD camera 1 were equivalent to the one shown in FIG. 4 exerting normal performance accuracy, then, light beam from the light source 11 is incident upon a picture element 3m of the solid sensor 2. On the other hand, if there were any distortion in the lens system 4, then, light beam from the light source 11 is incident upon another picture element 3n. Therefore, even when light beam is incident upon either the picture element 3m or the other picture element 3n, if only such a corrective process is executed to deal with this incident light as the one which is incident upon either of these picture elements at a predetermined angle "α" against the optical axis "a", then, such an incorrectly measured value caused by the distortion in the lens system 4 can properly be corrected. The calibration method mentioned above is repeatedly executed by rotating the CCD camera 1 in the vertical and horizontal directions by gradationally varying angle against the optical axis "a". After completing the above calibration process, the CCD camera 1 is effectively made available for measuring appearance of processed parts and bodies based on the calibrated data with extremely high precision.

The conventional calibration method described above by way of rotating the objective CCD camera can easily and properly provide three-dimensional angle of rotation of the CCD camera by applying a rotary encoder. Nevertheless, it is extremely difficult for any conventional calibration system to properly rotate the objective CCD camera merely by way of pivoting on the principal point of the lens system. In other words, the lens system comprises a variety of lenses which are combined with each other, and yet, the principal point of the lens system is substantially an optical ideal point which cannot precisely halted. Furthermore, even though the CCD camera can correctly pivot on the principal point of the lens system, from the viewpoint of micron-order, it is quite difficult for the conventional calibration system to correctly maintain the relationship between the angle of the incident light against the optical axis and the corresponding picture elements built in the solid sensor of the objective CCD camera. In consequence, any of the conventional calibration systems can hardly achieve a calibration process with extremely high precision. Furthermore, although precision in the calibration of the objective CCD camera can be promoted by rotating the CCD camera on the second basis or by applying an extremely fine angle below the second basis, it is technically quite difficult to correctly and stably rotate the objective CCD camera by strictly observing such an extremely fine angle. In consequence, these adverse factors obstruct any of those conventional systems to securely calibrate the objective CCD camera with extremely high precision.

SUMMARY OF THE INVENTION

Therefore, the invention has been achieved to fully solve those technical problems inherent in any of those conventional systems for calibrating an objective CCD camera described above. The object of the invention is to provide a novel method of calibrating an objective CCD camera, where the novel method embodied by the invention can easily and precisely execute a calibration process for correcting distortion present in a solid sensor built in the objective CCD camera requiring extremely high resolution.

To achieve the above object, the invention provides a novel method of executing a calibration process against an objective CCD camera, wherein the novel calibration method comprises those sequential processes including the following; a process for causing a spot light source held by a positioning device in front of a fixed CCD camera to be shifted between two remote points on a single visual line, wherein the shifting process is executed on a plurality of visual lines including optical axis of the objective CCD camera in order that light beam in the center of the spot light source can be incident upon a predetermined picture element of a solid sensor built in the objective CCD camera; a process for computing specific angles of those plural visual lines generated by the shift of the spot optical source against the light axis of the objective CCD camera based on position data concerning the positioning device; and a final process for calibrating the corresponding relationship between the angle of light beam incident upon the objective CCD camera and the corresponding picture element of the above-dentiffied solid sensor built in the objective CCD camera based on the computed angle data.

Specifically, after confirming that light beam from the spot light source is incident upon an identical picture element of the solid sensor built in the objective CCD camera, the spot light source can easily and correctly be shifted between two remote points on a single visual line including the optical axis in front of the CCD camera. Based on the position data of the positioning device, if there were longer distance available for shifting the spot light source in a single visual line, then, the angle against the optical axis of this visual line can be established more accurately and more finely. In this way, the art embodied by the invention initially figures out a specific angle of a visual line available for shifting the spot light source and then computes a specific coordinate of a predetermined picture element of the solid sensor upon which light beam from the spot light source is incident. In consequence, the art embodied by the invention correctly sets a specific picture element corresponding to light beam incident upon the objective CCD camera at a predetermined angle, thus enabling the novel calibration system to properly calibrate the objective CCD camera with extremely high precision.

According to the invention, a novel method of calibrating a CCD camera is hereby provided. The art embodied by the invention correctly and securely measures angles between specific visual lines and the optical axis generated by the shift of a spot light source which is subject to measurement and driven by a three-dimensional measuring apparatus disposed in front of an objective CCD camera. If there were longer distance available for shifting the spot light source in a visual line, then, angles between those visual lines and the optical axis can be measured more accurately and more securely in such an extremely fine order being less than a second basis. Therefore, even when calibrating such a high-resolution CCD camera incorporating a minimum of $1000 \times 1000$ units of picture elements built in a solid sensor of the CCD camera, the art embodied by the invention correctly calibrates the objective CCD camera by way of fully eliminating distortion from the solid sensor.

Furthermore, since the method embodied by the invention initially fixes the objective CCD camera at a predetermined position and then properly shifts a spot light source in the three-dimensional direction in front of the fixed CCD camera by means of a three-dimensional measuring apparatus, the novel calibration system embodied by the invention dispenses with such an expensive special instrument conventionally needed for rotating the objective CCD camera with high precision, but instead, any existing three-dimensional measuring apparatus can effectively be made available for the calibration system embodied by the invention. In consequence, operator can securely execute such an advantageous process for correctly calibrating the objective CCD camera without incurring additional investment cost.

The above and further objects and advantageous features of the invention will more fully be understood from the following detailed description in reference to the accompanying drawings that follow.

DESCRIPTION OF THE PREFERRED EMBODIMENTS

Figure 1:
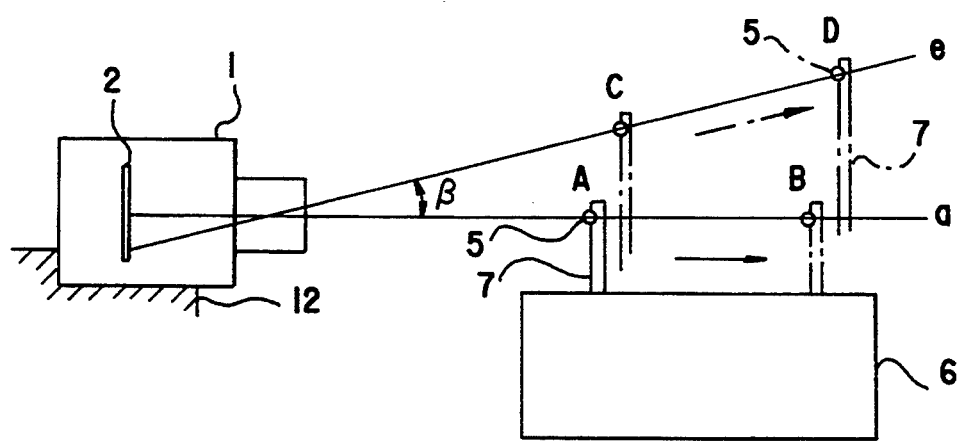
FIG. 1 schematically illustrates an overall lateral view of a calibration system available for implementing the method of calibrating a CCD camera according to an embodiment of the invention.

FIG. 1 is an overall lateral view of a calibration system available for implementing the method of calibrating an objective CCD camera according to an embodiment of the invention. An objective CCD camera 1 subject to calibration is secured onto a securing means 12 composed of a mounting base for example. A positioning device furnished with a light source 5 is installed in front of the objective CCD camera 1, where the embodiment of the invention provides a three-dimensional measuring apparatus 6 serving as the positioning device. The three-dimensional measuring apparatus 6 supports the light source 5 via a movable arm 7 in order that the light source 5 can be shifted by way of three dimensions. The three-dimensional measuring apparatus 6 detects the three-dimensional position of the light source 5 based on the micron unit.

Figure 2:
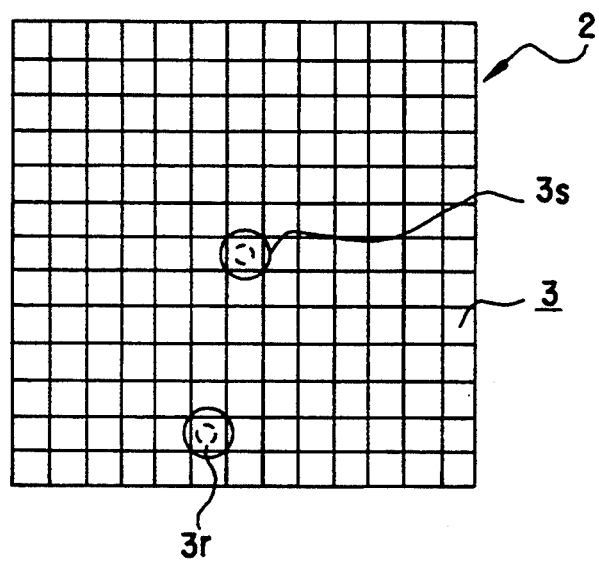
FIG. 2 illustrates a front view of a solid sensor built in the CCD camera shown in FIG. 1.

Next, functional operation of the calibration system embodied by the invention for calibrating the objective CCD camera 1 is described below. Initially, the three-dimensional measuring apparatus 6 sets the light source 5 to a predetermined point A which is right on the optical axis "a" of the CCD camera 1. This positioning operation is executed after confirming that a picture element 3s in the principal of a solid sensor 2 built in the CCD camera 1 has correctly received the center light beam from the light source 5 as shown in FIG. 2 by means of the encircled solid line in the center. Next, the light source 5 is shifted backward along the optical axis "a", and then the light source 5 is set to a point B which is remote from the point A. The backward movement of the light source 5 can easily be executed by checking to see that the light beam from the light source 5 will not deviate from the above-identified picture element 3s located in the center of the solid sensor 2. In this case, as shown in FIG. 2 with the encircled broken line, the amount of light beam incident upon the picture element 3s corresponding to the optical axis "a" diminishes. When this condition is entered, the three-dimensional measuring apparatus 6 computes coordinates of these points A and B provided for the light source 5 right on the optical axis "a", and then determines the three-dimensional directions of the optical axis "a" of the CCD camera 1 based on the computed coordinates.

Next, the three-dimensional measuring apparatus 6 shifts the light source 5 to a desired point C which is apart from the optical axis "a". Assume that, when the light source 5 is shifted to the point C, light beam from the light source 5 is incident upon a picture element 3r which is shown in the lower part of FIG. 2 by means of an encircled solid line. Next, while checking to see that the light beam incident upon the picture element 3r will not deviate from it, the three-dimensional measuring apparatus 6 backwardly shifts the light source 5 to a desired point D. Then, the three-dimensional measuring apparatus 6 computes coordinates of these points C and D and then figures out the three-dimensional angle of a visual line "e" connecting the point C to the point D by referring to the computed coordinates, thus eventually determining angle "$\beta$" between the visual line "e" and the optical axis "a".

The method embodied by the invention-also permits the calibration system to execute a process for inversely shifting the light source 5 from the point B to the point A and from the point D to the point C in the forward direction in order to compute angle "$\beta$" between the horizontal optical axis "a" and the oblique visual line "e".

Figure 3:
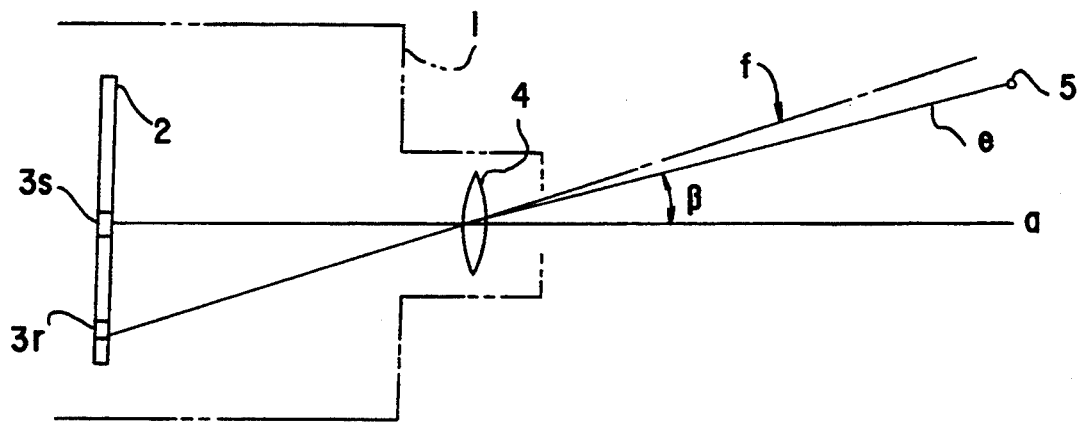
FIG. 3 schematically illustrates a block diagram of the calibration system being explanatory of the relationship between a solid sensor and light beam incident upon it.
Figure 4:
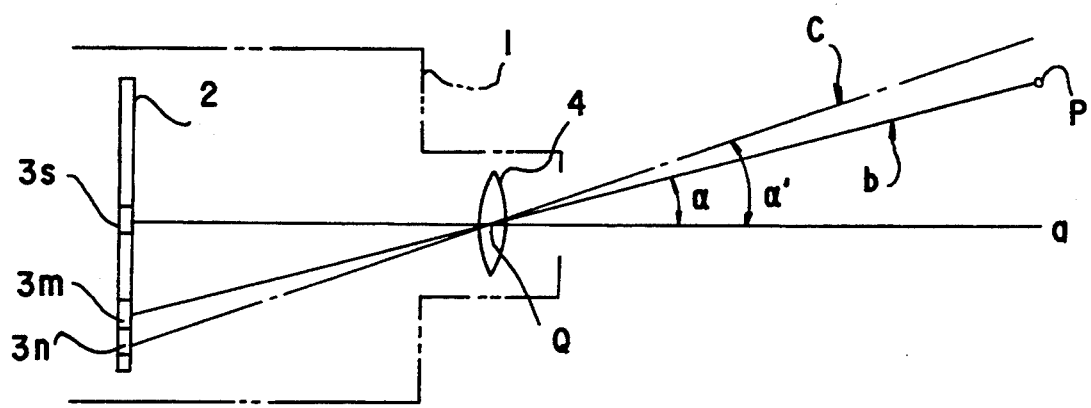
FIG. 4 schematically illustrates a block diagram of the calibration system being explanatory of the relationship between a solid sensor built in an objective CCD camera and light beam incident upon the solid sensor.
Figure 5:
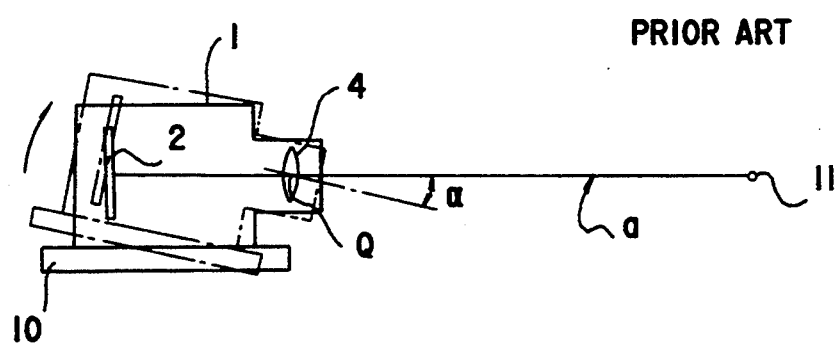
FIG. 5 schematically illustrates a block diagram of a conventional calibration system being explanatory of a conventional method of calibrating an objective CCD camera.

As described above, the method embodied by the invention initially shifts the light source 5 in a variety of directions, and then determines coordinates of specific picture elements built in the solid sensor 2 corresponding to those visual lines having a variety of angles against the optical axis "a" before eventually completing the whole calibration processes. Specifically, for example, in the event that any distortion is present in the lens system 4 built in the CCD camera 1, and yet, when the light beam from the oblique visual line "e" is incident upon the picture element 3r shown in FIG. 3, the CCD camera 1 will then incorrectly identify that the light beam is incident upon the picture element 3r along another oblique visual line "f" shown in FIG. 3 by means of a dot-chain line. To compensate for this, the three-dimensional measuring apparatus 6 executes a calibration process by operating an image processing unit after identifying that the light beam incident upon the picture element 3r is emitted via the oblique visual line "e" which is apart from the optical axis "a" by an angle "$\beta$".

The above description of the embodiment of the invention has solely referred to the integral system for calibrating the objective CCD camera related to the invention. Nevertheless, it is needless to mention that the scope of the invention is also effectively applicable to those one or two dimensional photosensors as well.

What is claimed is:

1. A method of calibrating a CCD camera comprising the steps of:

placing a spot light source, held by a positioning device, in front of a fixed CCD camera, at a first point on an optical axis of the CCD camera so that a light beam from said light source is incident upon one of a plurality of picture elements in a center of a solid sensor built in said CCD camera;

shifting said spot light source a predetermined distance along said optical axis to a second point remote from said first point while insuring that the light beam from said spot light source is incident upon said one of said plurality of picture elements;

shifting said spot light source in front of said fixed CCD camera by first, shifting to a third point which is apart from said optical axis so that the light beam from said light source is incident upon another one of said plurality of picture elements of said solid sensor, and second, shifting said spot light source to a fourth point while insuring that the light beam from said spot light source is incident upon said another one of said plurality of picture elements;

computing angles between a plurality of light beam lines, generated by shifting said spot light source in a plurality of directions from said optical axis of said CCD camera based on position data related to said positioning device; and calibrating a corresponding relationship between each angle of the light beams incident upon said CCD camera and said plurality of picture elements built in said solid sensor.

* * * * *